United States Patent
Sangavarapu et al.

(10) Patent No.: US 6,961,923 B2
(45) Date of Patent: Nov. 1, 2005

(54) METHOD OF DETECTING ZOMBIE BREAKPOINTS

(75) Inventors: Vamsi Krishna Sangavarapu, Bangalore (IN); Suparna Bhattacharya, Bangalore (IN); Richard J Moore, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 09/732,250

(22) Filed: Dec. 7, 2000

(65) Prior Publication Data

US 2002/0073401 A1 Jun. 13, 2002

(51) Int. Cl.[7] .................................................. G06F 9/44
(52) U.S. Cl. ...................................................... 717/124
(58) Field of Search ........................... 717/127, 4, 129, 717/125, 124; 718/100

(56) References Cited

U.S. PATENT DOCUMENTS

| | | | | |
|---|---|---|---|---|
| 5,632,032 A | * | 5/1997 | Ault et al. ................... 718/100 |
| 5,740,413 A | * | 4/1998 | Alpert et al. ................ 712/227 |
| 6,145,123 A | * | 11/2000 | Torrey et al. ............... 717/128 |
| 6,282,701 B1 | * | 8/2001 | Wygodny et al. ........... 717/125 |
| 6,321,329 B1 | * | 11/2001 | Jaggar et al. ............... 712/227 |
| 6,378,124 B1 | * | 4/2002 | Bates et al. ................. 717/129 |
| 6,378,125 B1 | * | 4/2002 | Bates et al. ................. 717/129 |
| 6,480,818 B1 | * | 11/2002 | Alverson et al. ............. 703/26 |
| 6,546,443 B1 | * | 4/2003 | Kakivaya et al. ........... 710/200 |
| 6,658,650 B1 | * | 12/2003 | Bates ........................... 717/127 |
| 6,708,326 B1 | * | 3/2004 | Bhattacarya ................ 717/124 |
| 2001/0004766 A1 | * | 6/2001 | Koyama ........................ 717/4 |
| 2002/0174415 A1 | * | 11/2002 | Hines ........................... 717/127 |

OTHER PUBLICATIONS

Richards et al., "Protocol–Based Data–Race Detection," May 1998, ACM.*
Stefan Savage, "Eraser: A Dynamic Data Race Detector for Multithreaded Programs," Oct. 1997, ACM.*
Jeong–Si Kim et al., "Scalable On–the–fly Detection of the First Races in Parallel Programs," Jul. 1998, ACM.*
Madalene Spezialetti et al., "Degugging Distributed Programs through the Detection of Simultaneous Events," Jun. 1994, IEEE.*
Jong–Deok Choi et al., "Race Frontier: Reproducing Data Races in Parallel–Program Debugging," Apr. 1991, ACM.*

* cited by examiner

*Primary Examiner*—Kakali Chaki
*Assistant Examiner*—Insun Kang
(74) *Attorney, Agent, or Firm*—Anthony V. S. England; T. Rao Coca

(57) ABSTRACT

A method, an apparatus, and a computer program product for detecting one or more zombie global breakpoints for debugging computer software are disclosed. The method includes the steps of: checking a breakpoint data structure to determine if a breakpoint known to a debugging process is at an address where a breakpoint fired; if a known breakpoint cannot be determined at the address, verifying if a breakpoint condition continues to exist at the address where the breakpoint fired; and if the breakpoint condition does not exist, identifying the breakpoint as a zombie breakpoint.

18 Claims, 3 Drawing Sheets

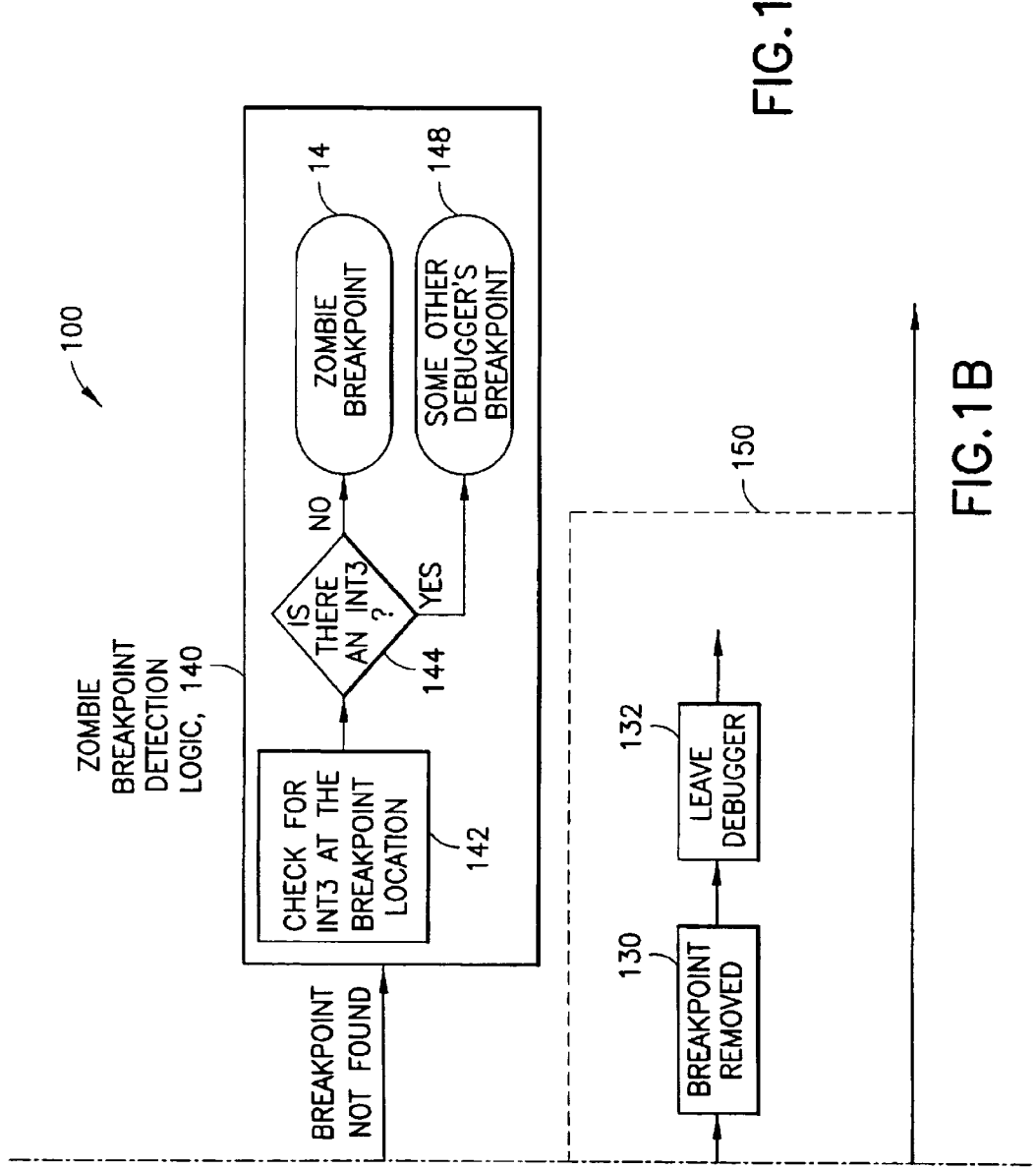

US 6,961,923 B2

METHOD OF DETECTING ZOMBIE BREAKPOINTS

FIELD OF THE INVENTION

The present invention relates to the debugging of software and computer programs and more particularly to the use of breakpoints in debugging processes.

BACKGROUND

Debugging is a process of detecting and locating errors or events in computer programs and other software with a view to eliminate such errors or events. Debugging may also involve the step of eliminating such errors. The debugging process is implemented using a debugger, which is a computer program or programs for detecting, tracing, and eliminating errors or events in computer programs, and other software. The latter are each referred to hereinafter as the "debugee".

A breakpoint is a point in a computer program or software where execution may be halted, normally at a place that is convenient for restarting execution of the program or software (i.e., the debugee) from that point. That is, breakpoints are events deliberately inserted or "planted" in a debugee by a debugger to receive control when the debugee reaches a certain point during execution of the debugee. At that point, the debugger needs access to the state of the debugee (perhaps with the ability to change that state), and either to resume or terminate execution of the debugee.

If a breakpoint is applicable only in the context of a specific process, the breakpoint is considered to be a local breakpoint. The same applies for plural breakpoints. Application debuggers generally use local breakpoints.

In contrast, global breakpoints are breakpoints active across all processes executing in a computer system, where two or more processes may use the same code segment. In other words, global breakpoints are applicable in all instances of a program or software code segment. If a global breakpoint event occurs, the debugger can instrument the debugged code irrespective of the process running that code. In this case, the concept of one debugee does not apply, and the target is not the process being debugged but the code that is being executed. Kernel-level debuggers and some code-instrumentation tools use global breakpoints, because the focus is on the code being debugged/instrumented and not on any specific process context.

Breakpoints are placed by a mechanism that enables the determination of whether a breakpoint condition is present at any time. Some common techniques for placing breakpoints are:

inserting a special instruction at breakpoint location, inserting an illegal instruction at breakpoint location, and using a special debug register at breakpoint location.

Breakpoints are typically placed using a special breakpoint instruction available on most processor architectures.

Implementing breakpoints for debugging multi-threaded applications under multi-processing environments presents a number of problems and detecting zombie breakpoints is one of the most difficult.

The term "zombie breakpoint" appears in the context of a race condition between a breakpoint hit in one thread/processor and the simultaneous removal of the same breakpoint in the context of another thread/processor. By the time the breakpoint handler gets to process the breakpoint hit, the breakpoint has been removed without any trace by another thread/processor and is no longer "owned" by the debugger. This leads to a situation, where the breakpoint handler thinks that the breakpoint event happened due to some other external cause and incorrectly passes the breakpoint back to the operating system, which treats the breakpoint as an unhandled exception.

Thus, a need exists for an improved method of detecting zombie breakpoints.

SUMMARY

In accordance with a first aspect of the invention, a method of detecting one or more zombie global breakpoints for debugging computer software is disclosed. The method includes the steps of:

checking a breakpoint data structure to determine if a breakpoint known to a debugging process is at an address where a breakpoint fired;

if a known breakpoint cannot be determined at the address, verifying if a breakpoint condition continues to exist at the address where the breakpoint fired; and if the breakpoint condition does not exist, identifying the breakpoint as a zombie breakpoint.

The verifying step may include the step of checking that a special breakpoint instruction exists at the address, being the exception location. Further, the verifying step may include the step of checking that an illegal breakpoint instruction exists at the address, being the exception location. Still further, the verifying step may include the step of checking that the address, being the exception location, is present in a special debug register.

Preferably, physical settings for causing a breakpoint exception at a particular location are detectable from a breakpoint handler. Breakpoint removal logic is preferably provided that lifts a physical breakpoint instruction from a breakpoint location before removing a breakpoint entry from the breakpoint data structure of the debugging process.

In accordance with a second aspect of the invention, a computer-implemented apparatus for detecting one or more zombie global breakpoints for debugging computer software is disclosed. The apparatus includes:

a central processing unit for executing the computer software;

memory for storing at least a portion of the computer software;

a module for checking a breakpoint data structure to determine if a breakpoint known to a debugging process is at an address where a breakpoint fired;

a module for, if a known breakpoint cannot be determined at the address, verifying if a breakpoint condition continues to exist at the address where the breakpoint fired; and a module for, if the breakpoint condition does not exist, identifying the breakpoint as a zombie breakpoint.

In accordance with a third aspect of the invention, a computer program product having a computer readable medium having a computer program recorded therein for detecting one or more zombie global breakpoints for debugging computer software is disclosed. The computer program product includes:

a computer program code module for checking a breakpoint data structure to determine if a breakpoint known to a debugging process is at an address where a breakpoint fired;

a computer program code module for, if a known breakpoint cannot be determined at the address, verifying if a breakpoint condition continues to exist at the address where the breakpoint fired; and a computer program code module for, if the breakpoint condition does not exist, identifying the breakpoint as a zombie breakpoint.

BRIEF DESCRIPTION OF THE DRAWINGS

A small number of embodiments are described hereinafter, in which.

DETAILED DESCRIPTION

Figure 1A:
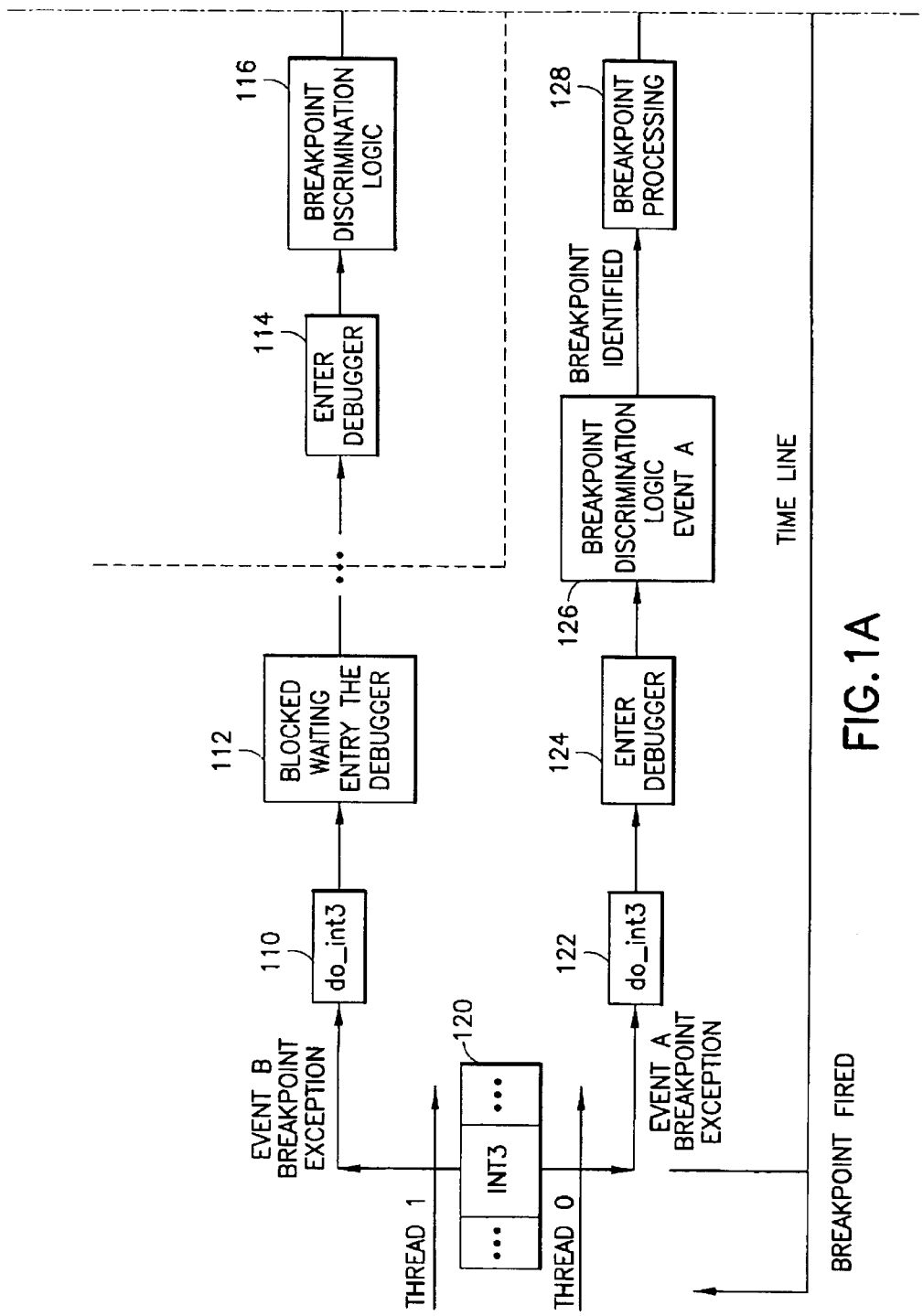
FIG. 1 is a flow diagram illustrating a process for identifying a zombie breakpoint in accordance with the preferred embodiment of the invention.

A method, an apparatus, and a computer program product are disclosed for identifying or detecting one or more zombie breakpoints for debugging computer software. In the following description, numerous details are set forth including particular operating systems. It will be apparent to one skilled in the art, however, that the present invention may be practised without these specific details. In other instances, well-known features are not described in detail so as not to obscure the present invention.

In the following description, components of the zombie breakpoint identification system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The embodiments of the invention provide a breakpoint-discrimination process (whether implemented by part of the operating system kernel or by a separate debugger) to deal with the following problem. In the following discussion, the term "debugger" is used to refer to the part of an operating system kernel that performs the functions of a debugger or a separate debugger module. Assuming a single instance of a debugger with some kind of serialisation ensuring that only one thread is actually "in" the debugger at any time, the following situation may arise when zombie breakpoint discrimination has to be performed by the debugger itself:

1. Threads A and B hit a breakpoint at nearly the same time. At the system level, these are simply two reportable events.
2. One of the threads (e.g. A) gains entry to the debugger, while the other thread (B) remains pending, waiting for the debugger to finish with event A.
3. Event A is analysed and reported to be a breakpoint.
4. The user decides to cancel the breakpoint and resumes thread A.
5. Event B is then reported to the debugger.
6. Event B is analysed, but there is no breakpoint anymore and indeed the interrupt information may be inconsistent.

This is a tricky and subtle problem that is not addressed in other debugging instrumentation tools. If the debugger does not detect the zombie breakpoint condition correctly, the operating system incorrectly assumes the breakpoint exception to be an unhandled exception and takes the default action, which usually results in the debuggee terminating. This is a significant problem that needs to be solved to implement a debugger that can be used to debug highly timing-sensitive multi-threaded applications correctly under all circumstances.

In the embodiments of the invention, breakpoint-discrimination logic in a debugger is responsible for looking up breakpoint data structures to determine if there is a breakpoint known to the debugger at the address where the breakpoint is fired. If this routine cannot find a known breakpoint, the debugger recognises that this may be a zombie breakpoint and does just one more check: verify if the breakpoint condition is still at the address where the breakpoint is fired. If the breakpoint is not there, a zombie breakpoint is identified and handled accordingly. On the other hand, if the breakpoint instruction is still at the breakpoint location, this breakpoint exception must have been meant for a different facility and is not treated as a relevant breakpoint.

The exact method of checking for a breakpoint condition as mentioned above depends on the way in which breakpoints are inserted in the first place. This could be by any of the following:

check that the special breakpoint instruction is still at the exception location, check that the illegal instruction is still at the exception location, and check that the exception location is still present in the special debug register.

The main, if not only, requirement for this method to work is that the physical settings for causing a breakpoint exception at a particular location be detectable from a breakpoint handler.

For this approach to work smoothly, the breakpoint removal logic takes care to first lift the physical breakpoint instruction from the breakpoint location before removing the breakpoint entry from the data structures of the debugging. Linux (on Intel x86) Specific Implementation Details The preferred embodiment utilises an Intel x86 platform for the sake of simplicity. The embodiments are similarly applicable to other processor architectures. The following description of the preferred embodiment is from the point of view of the debugger/tool utilising the solution described above:

a. Apply global breakpoints by inserting a special breakpoint instruction (INT3) at the desired locations.

b. Assuming two threads, executing on different processors, hit the same INT3 at the same time (events A and B).

c. Assume Event A enters the breakpoint discrimination logic first.

d. Event A is determined to be a breakpoint and is reported (handle Event A).

e. User removes the breakpoint being handled (INT3) while handling Event A.

f. Next, Event B enters the breakpoint discrimination logic.

g. Event B is not considered a breakpoint as the breakpoint has been removed in step e above.

h. Verify if there is an INT3 instruction at the trapping location.

i. The INT3 Instruction is not there as step e above removed the breakpoint.

Thus, event B is due to a breakpoint that has been removed after being hit (i.e., a zombie). Once a zombie breakpoint is detected, the breakpoint can be handled according to a policy defined by the debugger to handle zombie breakpoints.

FIG. 1 illustrates the process for detecting zombie breakpoints according to the preferred embodiment. With respect to the process 100, a time line is indicated. The breakpoint instruction, i.e., INT3, is contained in a code module 120 that is being executed on two processors or threads 0, 1. At a specified point in time, a breakpoint is fired. Event A is the breakpoint exception for thread 0, while event B is the breakpoint exception for thread 1. In step 122, a do_int3 process is executed. This is done in parallel with the do_int3 module 110 for event B. The module do_int3 110, 122 is the breakpoint exception handler in the Linux Kernel on Intel platforms. However from step 122, in step 124, event A enters the debugger. Meanwhile in parallel step 112, the processing of event B is blocked waiting entry of the debugger.

In the time line, after step 124, breakpoint discrimination logic processes event A at step 126. The identified breakpoint is then provided to a breakpoint processing module 128. In step 130, the breakpoint is removed for event A. Processing then continues in step 132, in which the debugger is left. A dashed line 150 shown in FIG. 1 is meant to relate the timing of event B to that of event A. The steps to the right of dashed line 150 occur after step 112 and after step 132. As described earlier, after step 122, processing of event B was blocked waiting entry of the debugger. After step 132 for event A is performed, event B can then enter the debugger in step 114 from step 112. From step 114, breakpoint discrimination logic is applied to event B in step 116. However step 116 does not find the relevant breakpoint. This is because the breakpoint was removed in step 130 for event A. Processing after step 116 enters the zombie breakpoint detection logic 140. In particular, processing continues at step 142.

In step 142, a check is performed to locate the instruction INT3 at the breakpoint location. Processing then continues at decision step 144. In decision block 144, a check is made to determine if there is an INT3 instruction at the breakpoint location. If decision block 144 returns false (no), a zombie breakpoint is determined at step 14. Otherwise, if decision block 144 returns true (yes), a determination is made at step 148 that a breakpoint of some other debugger has been found.

Special Situations

The applicability of the embodiments is discussed for cases even when the debugger utilising the technique operates in the presence of other debugging tools that may utilize similar techniques for placing breakpoints.

If another debug facility, running on another processor, puts an INT3 instruction at the same location in the meanwhile (after block 130 and before block 114 in the time line as shown in FIG. 1), an INT3 is then seen at the breakpoint location (in the decision block 144 in FIG. 1), though not the one placed by the relevant debugger. Then the correct conclusion is made: that this INT3 is due to a breakpoint placed by another debug facility, and normal processing of the operating system's breakpoint exception handler do_int3 will let the correct debug facility handle the breakpoint.

Another debug facility running on another processor may put an INT3 instruction at the same location in the meanwhile (i.e. after block 130 and before block 114), hit the breakpoint and then remove the breakpoint again. All of this may occur before block 114 is reached. If so, the relevant debugger arriving at step 144 decides there is no INT3 instruction at the breakpoint location and that this is a zombie breakpoint. Again, this is the correct thing to do under the circumstances.

Thus, the embodiments work correctly even in the presence of other debug facilities.

The embodiments advantageously provided a simple method of detecting zombie breakpoints in the context of global breakpoints under a multi-processor environment.

The embodiments of the invention are preferably implemented using a general-purpose computer. In particular, the processing or functionality of FIG. 1 can be implemented as software, or a computer program, executing on the computer. The method or process steps for detecting one or more zombie global breakpoints for debugging computer software are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects advantageous apparatuses for detecting one or more zombie global breakpoints for debugging computer software.

Figure 2:
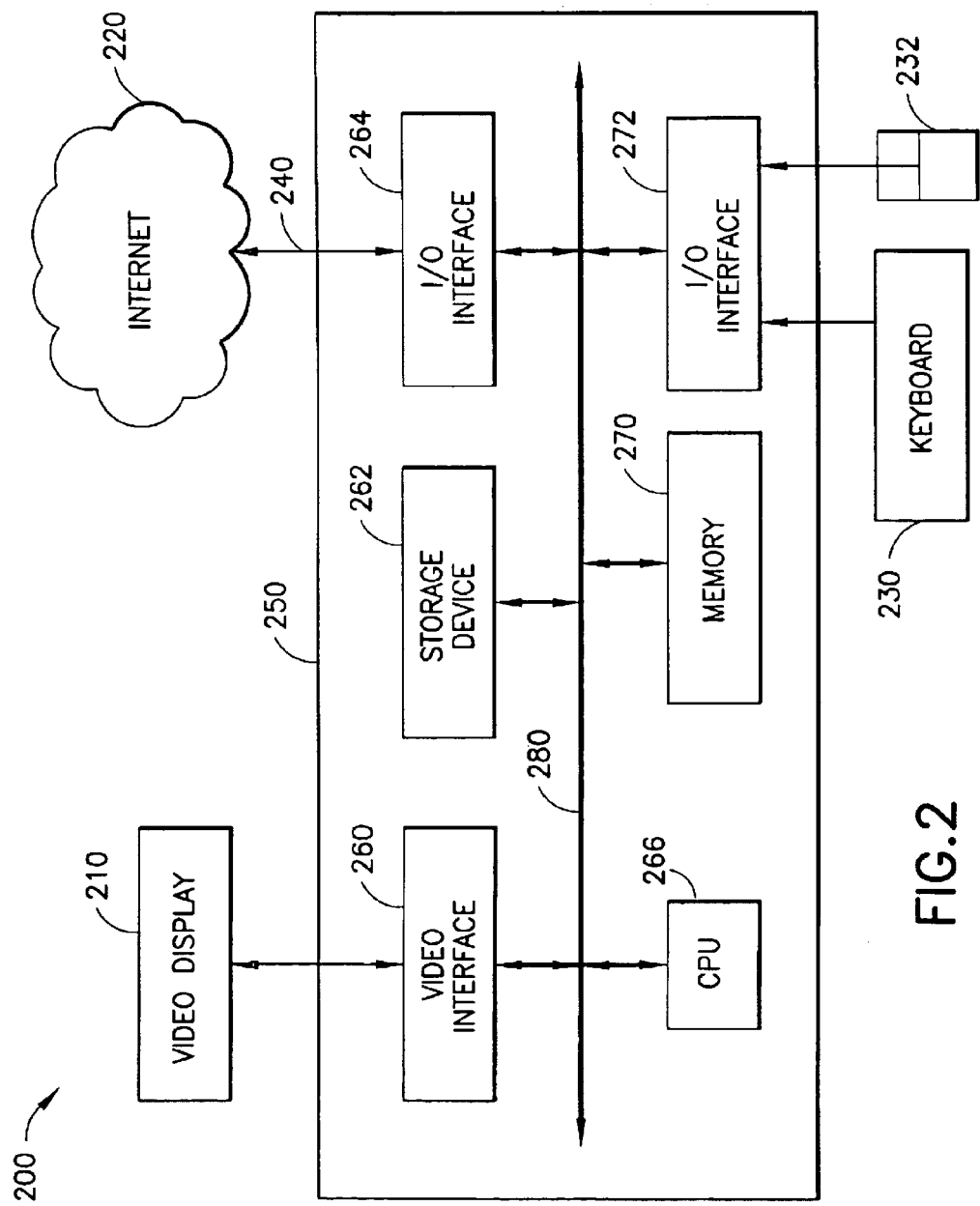
FIG. 2 is a block diagram illustrating a general purpose computer, with which embodiments of the invention can be practiced.

Preferably, a computer system 200 shown in FIG. 2 includes the computer 250, a video display 210, and input devices 230, 232. In addition, the computer system 200 can have any of a number of other output devices including line printers, laser printers, plotters, and other reproduction devices connected to the computer 250. The computer system 200 can be connected to one or more other computers via a communication interface using an appropriate communication channel 240 such as a modem communications path, a computer network, or the like. The computer network 220 may include a local area network (LAN), a wide area network (WAN), an Intranet, and/or the Internet.

The computer 200 itself preferably includes a central processing unit(s) 266 (simply referred to as a processor hereinafter), a memory 270 which may include random access memory (RAM) and read-only memory (ROM), input/output (IO) interfaces 264, 272, a video interface 260, and one or more storage devices 262. The storage device(s) 262 can include one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus 280 that in turn can consist of data, address, and control buses.

The video interface 260 is connected to the video display 210 and provides video signals from the computer for display on the video display 210. User input to operate the computer can be provided by one or more input devices 230, 232. For example, an operator can use a keyboard 230 and/or a pointing device such as the mouse 232 to provide input to the computer.

The foregoing system is simply provided for illustrative purposes and other configurations can be employed without departing from the scope and spirit of the invention. Computers with which the embodiment can be practiced include IBM-PC/ATs or compatibles, one of the Macintosh (™) family of PCs, Sun Sparcstation (™), a workstation or the like. The foregoing are merely examples of the types of computers with which the embodiments of the invention may be practiced. Typically, the processes of the embodiments, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet 220 and Intranets including email transmissions and information recorded on websites and the like. The foregoing are merely examples of relevant computer readable mediums. Other computer readable mediums may be practiced without departing from the scope and spirit of the invention.

Finally, while the preferred embodiment is implemented using the Linux operating system, it will be appreciated by those skilled in the art in view of this disclosure that the embodiments of the invention can be practiced with other operating systems as well. Further, even though the embodiment is described in the context of the Intel x86 architecture, embodiments of the invention can be applied to other processor architectures, as long as the physical settings for causing a breakpoint exception at a particular location can be detected explicitly within a breakpoint handler.

In the foregoing manner, a method, an apparatus, and a computer program product for detecting one or more zombie global breakpoints for debugging computer software are disclosed. While only a small number of embodiments are described, it will be apparent to those skilled in the art in view of this disclosure that numerous changes and/or modifications can be made without departing from the scope and spirit of the invention.

We claim:

1. A method of detecting one or more zombie global breakpoints for debugging computer software, said method including the steps of:
    checking a breakpoint data structure to determine if the data structure has an entry for a breakpoint known to a debugging process for a certain address where the breakpoint fired;
    if no entry is found by the checking of the data structure for the entry for the known breakpoint, verifying if a breakpoint condition continues to exist at the address where the breakpoint fired; and
    if said breakpoint condition does not exist in the varying step, identifying said breakpoint as a zombie breakpoint.

2. The method according to claim 1, wherein said verifying step includes the step of checking that a special breakpoint instruction exists at said address, being the exception location.

3. The method according to claim 1, wherein said verifying step includes the step of checking that an illegal breakpoint instruction exists at said address, being the exception location.

4. The method according to claim 1, wherein said verifying step includes the step of checking that said address, being the exception location, is present in a special debug register.

5. The method according to claim 1, wherein physical settings for causing a breakpoint exception at a particular location are detectable from a breakpoint handler.

6. The method according to claim 5, wherein breakpoint removal logic is provided that lifts a physical breakpoint instruction from a breakpoint location before removing a breakpoint entry from said breakpoint data structure of said debugging process.

7. A computer-implemented apparatus for detecting one or more zombie global breakpoints for debugging computer software, said apparatus including:
    a central processing unit for executing computer software;
    memory for storing at least a portion of said computer software;
    means for checking a breakpoint data structure to determine if the data structure has an entry for a breakpoint known to a debugging process for a certain address where the breakpoint fired;
    means for, if no entry is found by the checking of the data structure for the entry for the known breakpoint, verifying if a breakpoint condition continues to exist at the address where the breakpoint fired; and
    means for, if said breakpoint condition does not exist in the verifying, identifying said breakpoint as a zombie breakpoint.

8. The apparatus according to claim 7, wherein said verifying means includes means for checking that a special breakpoint instruction exists at said address, being the exception location.

9. The apparatus according to claim 7, wherein said verifying means includes means for checking that an illegal breakpoint instruction exists at said address, being the exception location.

10. The apparatus according to claim 7, wherein said verifying means includes means for checking that said address, being the exception location, is present in a special debug register.

11. The apparatus according to claim 7, wherein physical settings for causing a breakpoint except ion at a particular location are detectable from a breakpoint handler.

12. The apparatus according to claim 11, wherein breakpoint removal logic is provided that lifts a physical breakpoint instruction from a breakpoint location before removing a breakpoint entry from said breakpoint data structure of said debugging process.

13. A computer program product having a computer readable medium having a computer program recorded therein for detecting one or more zombie global breakpoints for debugging computer software, said computer program product including:
    computer program code means for checking a breakpoint data structure to determine if
    the data structure has an entry for a breakpoint known to a debugging process for a certain
    address where the breakpoint fired;
    computer program code means for, if no entry is found by the checking of the data structure for the entry for the known breakpoint, verifying if a breakpoint condition continues to exist at the address where the breakpoint fired; and computer program code means for, if said breakpoint condition does not exist in the verifying, identifying said breakpoint as a zombie breakpoint.

14. The computer program product according to claim 13, wherein said computer program code means for verifying includes computer program code means for checking that a special breakpoint instruction exists at said address, being the exception location.

15. The computer program product according to claim 13, wherein said computer program code means for verifying includes computer program code means for checking that an illegal breakpoint instruction exists at said address, being the exception location.

16. The computer program product according to claim 13, wherein said computer program code means for verifying includes computer program code means for checking that said address, being the exception location, is present in a special debug register.

17. The computer program product according to claim 13, wherein physical settings for causing a breakpoint exception at a particular location are detectable from a breakpoint handler.

18. The computer program product according to claim 17, wherein breakpoint removal logic is provided that lifts a physical breakpoint instruction from a breakpoint location before removing a breakpoint entry from said breakpoint data structure of said debugging process.

* * * * *

UNITED STATES PATENT AND TRADEMARK OFFICE
CERTIFICATE OF CORRECTION

| | | |
|---|---|---|
| PATENT NO. | : 6,961,923 B2 | |
| APPLICATION NO. | : 09/732250 | |
| DATED | : November 1, 2005 | |
| INVENTOR(S) | : Vamsi Sangavarapu et al. | |

It is certified that error appears in the above-identified patent and that said Letters Patent is hereby corrected as shown below:

Column 7: the 12th line of claim 1, as the claim is set out in the printed patent, which reads "in the varying" should read --in the verifying--.

Signed and Sealed this

Second Day of January, 2007

JON W. DUDAS
*Director of the United States Patent and Trademark Office*